US008539347B2

(12) United States Patent
Harrington (10) Patent No.: US 8,539,347 B2
(45) Date of Patent: Sep. 17, 2013

(54) TIME SEQUENCING OF EDITING STEPS IN A TWO-DIMENSIONAL DIGITAL DOCUMENT

(75) Inventor: Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 820 days.

(21) Appl. No.: 12/718,317

(22) Filed: Mar. 5, 2010

(65) Prior Publication Data

US 2011/0219298 A1 Sep. 8, 2011

(51) Int. Cl.
*G06F 17/24* (2006.01)
*G06F 17/25* (2006.01)

(52) U.S. Cl.
USPC .......................................... 715/256; 345/419

(58) Field of Classification Search
USPC ......................................................... 715/256
See application file for complete search history.

(56) References Cited

U.S. PATENT DOCUMENTS

| | | | | |
|---|---|---|---|---|
| 4,809,065 A | * | 2/1989 | Harris et al. | 348/51 |
| 5,530,947 A | * | 6/1996 | Takasaki et al. | 345/619 |
| 5,559,940 A | * | 9/1996 | Hutson | 715/234 |
| 6,721,729 B2 | * | 4/2004 | Nguyen et al. | 1/1 |
| 8,010,900 B2 | * | 8/2011 | Hart et al. | 715/747 |
| 2001/0049704 A1 | * | 12/2001 | Hamburg et al. | 707/530 |
| 2007/0014465 A1 | * | 1/2007 | Numata et al. | 382/131 |
| 2008/0222170 A1 | * | 9/2008 | Farnham et al. | 707/100 |
| 2010/0274820 A1 | * | 10/2010 | O'Brien et al. | 707/805 |

OTHER PUBLICATIONS

Meng et al., "Visualizing Histories for Selective Undo and Redo", 1998, ACM, pp. 1-6.*

* cited by examiner

*Primary Examiner* — James Debrow
(74) *Attorney, Agent, or Firm* — Philip E. Blair; Fleit Gibbons Gutman Bongini & Bianco P.L.

(57) ABSTRACT

What is provided is a system and method for time sequencing editing steps for allowing users to visualize and modify the editing history of a two-dimensional digital document. A three-dimensional image of the document is presented to the user with time of editing being represented as a third dimension. This three-dimensional presentation of editing operations provides the user with an "omniscient" perspective of the document where part of all of a document's editing history is represented. The document state at any point in its life, as affected by various previously preformed editing operations, is given by a corresponding slice through the three-dimensional object. The user is provided with an ability to manipulate the three-dimensional representation to not only undo prior operations but also to perform different editing operations at anytime in the editing history of the document, and thereby change the editing history of the document. Various embodiments are disclosed.

18 Claims, 6 Drawing Sheets

TIME SEQUENCING OF EDITING STEPS IN A TWO-DIMENSIONAL DIGITAL DOCUMENT

TECHNICAL FIELD

The present invention is directed to systems and methods for displaying and manipulating prior editing operations performed on a digital document.

BACKGROUND

The creation and editing of a document occurs as a series of actions by the user. Document editing software typically presents a two-dimensional image of the current document state. Editing changes that state by a sequence of user initiated transitions caused by editing commands. Editing systems typically provide an undo function that lets the user reverse one or more of their editing actions, but there is not an easy way to reach back in time and alter the editing history of the document.

Accordingly, what is needed in this art are increasingly sophisticated systems and methods which allow users to visualize and modify an editing history of a two-dimensional digital document.

BRIEF SUMMARY

What is provided is a novel system and method for time sequencing editing steps for allowing users to visualize and modify the editing history of a two-dimensional digital document. A three-dimensional image of the document is presented to the user with time of editing being represented as a third dimension. This three-dimensional presentation of editing operations provides the user with an "omniscient" perspective of the document where part of all of a document's editing history is represented. The document state at any point in its life, as affected by various previously preformed editing operations, is given by a corresponding slice through the three-dimensional object. The user is provided with an ability to manipulate the three-dimensional representation to not only undo prior operations but also to perform different editing operations at anytime in the editing history of the document, and thereby change the editing history of the document.

In one example embodiment, the present method for presenting a time sequence of editing steps in a two-dimensional document performs according to the following. A first editing command for a first two-dimensional object within a two-dimensional electronic document is accepted at a first time on an electronic document editing device. The two-dimensional electronic document defines objects with a first dimension and a second dimension. A second editing command to modify the definition of the first two-dimensional object within at least one of the first dimension and the second dimension is accepted at the electronic document editing device at a second time that is subsequent to the first time. A representation of a three-dimensional structure corresponding to the first two-dimensional object is displayed on a display device. The three-dimensional structure depicts at least one of the first dimension and the second dimension and represents time as a third dimension that is orthogonal to the first dimension and the second dimension. The three-dimensional structure represents a time interval between the first time and the second time as a three-dimensional representation of the first two-dimensional object as modified by the first editing command. First dimension components and second dimension components of the three-dimensional structure correspond to the first editing command and extended along the third dimension though-out the time interval. The three-dimensional structure further represents a time interval subsequent to the second time as a three-dimensional representation of the first two-dimensional object as modified by the second editing command with first dimension components and second dimension components corresponding to the second editing command and extended along the third dimension. Various embodiments have been disclosed.

The foregoing and other features and advantages will be apparent from the following more particular description of the embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided is a system and method for time sequencing editing steps for allowing users to visualize and modify the editing history of a two-dimensional digital document. In a manner more fully described herein, a three-dimensional image of the document is presented to the user with time of editing being represented as a third dimension. This three-dimensional presentation of editing operations provides the user with an "omniscient" perspective of the document where part of all of a document's editing history is represented. The document state at any point in its life, as affected by various previously preformed editing operations, is given by a corresponding slice through the three-dimensional object. The user is provided with an ability to manipulate the three-dimensional representation to not only undo prior operations but also to perform different editing operations at anytime in the editing history of the document, and thereby change the editing history of the document.

It should be understood that one of ordinary skill in this art would be knowledgeable about text and/or graphical document editing techniques and development of software to perform such editing and providing user interfaces to effectively provide user displays and accept user input to perform such editing. One of ordinary skill in this art would also be knowledgeable about computer science and software and programming systems and methods sufficient to implement the functionality and capabilities described in detail herein in their own hardware environments without undue experimentation.

A "two-dimensional document" is a document which, when reduced to a viewable form, can be characterized by a height and a width, containing one or more objects as defined herein further. An example two-dimensional document is a hardcopy print of a page of a document containing, for example, an embedded graphic.

A "document" or "digital document" or "document image" refers to an electronic version of a two-dimensional document. Various image input devices can generate a digital document in a manner well understood in the xerographic arts.

A "two-dimensional object", (or simply "object") as used herein, means color critical content contained within a document such as, for example, images, graphics, pictures, colors, text, and the like. Each document can contain multiple objects. In general, object content contained within a digital document can be classified into a plurality of generic categories, namely: contone objects, text objects, line art, graphic objects, and solid fill objects.

To "display" means to reduce a document image or an object to a viewable form via any type of text and/or image reproduction, including hardcopy printing or display. The reduced image may be in a transitory state when displayed on a computer terminal, monitor, LCD, and the like.

An "editing command" is a command to create or alter an object within a document. Editing commands are able to be used to create and/or alter text, graphics, or any object that is able to be contained within a document. Editing commands include, for example and without limitation, commands to create, resize, change a color associated with, delete, or move any type of object.

"Electronic document editing device" refers to any electronic device suitable for processing a document or image. Processing performed by an electronic document editing device is able to include, for example and without limitation, creating, editing, modifying, displaying, copying, capturing, printing, and the like.

"Editing step" refers to performing any editing command.

"Modify a definition of a two-dimensional object" means applying one or more editing commands to an object that is contained within a document so as to alter the object's size, shape, location, or appearance.

A "three-dimensional structure" refers to a conceptual three-dimensional volume that includes one or more bodies occupying that volume. Each body within the volume is defined by dimensional components for each of the three dimensions.

A "body" within a three-dimensional structure generally has a surface defining its boundary. The surface of a body within a three-dimensional structure is able to take on any shape.

A "representation of a three-dimensional structure" refers to a depiction of a three-dimensional structure that is able to be observed by a user. Representations of three-dimensional structures are often created by displaying a projection of the three-dimensional structure onto a plane and presenting that projection on a display device or user output, such as a computer terminal, printed page, and the like.

"Points in the representation of the three-dimensional structure" refers to any particular set of points that are within a displayed representation of surfaces of a three-dimensional structure. The representation of the three-dimensional structure is often depicted as a projection onto a plane that is observed by a user. The points in the representation of the three-dimensional structure refer to points that are located on that projection as it is observed at a particular time by the user.

"Performing a sequence of editing commands" refers to applying an ordered sequence of one or more editing commands to one or more objects contained within a document. Performing that ordered sequence of editing commands causes a unique transformation of the objects on which the sequence is performed.

A "prior editing command" is an editing command which has been previously performed on a document. An example prior editing command is to resize an object within a document.

"Undo a prior editing command" or simply "undoing an editing command" refers to a user command intended to return an object, for instance, back to its condition prior to the execution of a prior editing command.

"Modification of an editing command" refers to altering an editing history of a document so as to change a prior editing command that was originally performed to be a different editing command.

"User interface input object" refers to a user interface facility that allows a user to input user created data. An example of a user interface input object is, for example and without limitation, a graphical field into which a user is able to type, for example, text and/or numeric data.

A "text field" is a two-dimensional display element that containing text. A text field is able to include, for example, a single alphanumeric character or a sequence of alphanumeric characters comprising one or more lines of text.

"Graphical shape" is any two-dimensional shape that is able to be represented in a two-dimensional document. Graphical shapes are often defined by a closed perimeter that is able to take on any shape.

A "storage device" refers to a device or system capable of storing documents or images. One embodiment of a storage device is a database, as are well known in the arts, placed in communication with a computer system, workstation, and/or server, that is either remote from or collocated with a device hosting a computing process that accesses and/or stores documents or images of document. Storage devices include RAM, ROM, Cache Memory, CD-ROM, DVD, flash drives, hard drives, and other volatile or non-volatile storage media.

Figure 1:
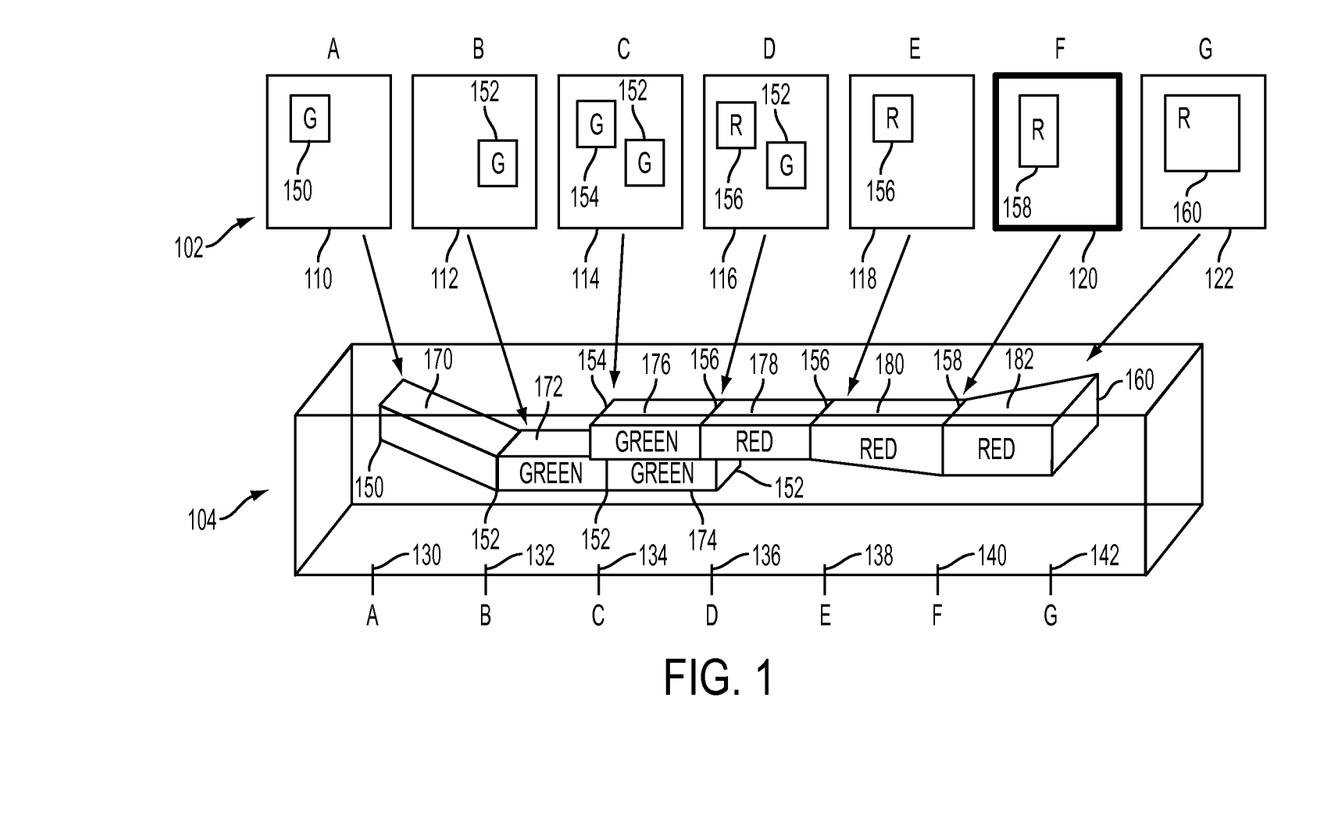
FIG. 1 is a first omniscient editing view of a document, in accordance with one aspect of the present invention.

Reference is now made to FIG. 1, which is a first omniscient editing view 100 of a document, in accordance with one aspect of the present invention.

The first omniscient editing view 100 depicts two representations of a short editing sequence. An editing sequence 102 depicts individual representations of a two-dimensional document as it progresses through seven editing stages or steps. An omniscient view editing timeline 104 is a three-dimensional representation that depicts the sequential editing sequence in a manner that is more convenient for a user to see the historical development of the shapes of the image components being created and/or modified by the editing sequence.

A first stage "A" of the document's editing sequence is depicted as a first stage two-dimensional view "A" 110 and a first time axis coordinate "A" 130 within the omniscient editing view 104. At the first stage "A," a first green rectangle 150 has been created as shown in the first two-dimensional view "A" 110. The first green rectangle 150 is also depicted in a first "slice" of the omniscient view editing timeline 104 that is a two-dimensional slice at the first time axis coordinate "A" 130 of the omniscient view editing timeline 104.

A second stage "B" of the document's editing sequence is depicted as a second stage two-dimensional view "B" 112 and a second time axis coordinate "B" 132 within the omniscient editing view 104. At this second stage "B," the first green rectangle 150 has been moved by an editing command to the lower right corner to create a moved first green rectangle 152. The omniscient view editing timeline 104 includes a first graphical volume 170, which is a three-dimensional structure representing the editing command to move the first green rectangle 150 to the location of the second green rectangle 152 between the first time axis coordinate "A" 130 and the second time axis coordinate "B" 132. The second green rectangle 152 is also depicted in a second "slice" of the omniscient view editing timeline 104 that is a two-dimensional slice at the second time axis coordinate "B" 132 of the omniscient view editing timeline 104.

A third stage "C" of the document's editing sequence is depicted as a third stage two-dimensional view "C" 114 and a third time axis coordinate "C" 134 within the omniscient editing view 104. In this third stage "C," a third green rectangle 154 is created. The omniscient view editing timeline 104 includes a second graphical volume 172 to depict this continued, unmodified existence of the moved first green rectangle 152 between the second time axis coordinate "B" 132 and the third time axis coordinate "C" 134. The third green rectangle 154 is also depicted along with the moved first green rectangle 152 in a third "slice" of the omniscient view editing timeline 104 that is a two-dimensional slice at the third time axis coordinate "C" 134 of the omniscient view editing timeline 104.

A fourth stage "D" of the document's editing sequence is depicted as a fourth stage two-dimensional view "D" 116 and a fourth time axis coordinate "D" 136 within the omniscient editing view 104. In this fourth stage "D," the color of the second green rectangle is changed to red, to create a first red rectangle 156. The omniscient view editing timeline 104 includes a third graphical volume 174 and a fourth graphical volume 176 to depict the continued, unmodified existence of the moved first green rectangle 152 and the third green rectangle 154 between the third time axis coordinate "C" 134 and the fourth time axis coordinate "D" 136, respectively. The first red rectangle 156 is also depicted in a fourth "slice" of the omniscient view editing timeline 104 that is a two-dimensional slice at the fourth time axis coordinate "D" 136 of the omniscient view editing timeline 104.

A fifth stage "E" of the document's editing sequence is depicted as a fifth stage two-dimensional view "E" 118 and a fifth time axis coordinate "E" 138 within the omniscient editing view 104. At this fifth stage "E," the moved first green rectangle 152 has been deleted. The omniscient view editing timeline 104 includes a fifth graphical volume 178 to depict the existence of the first red rectangle 156 between the fourth time axis coordinate "D" 136 and the fifth time axis coordinate "E" 138. The omniscient view editing timeline 104 further shows an absence of the moved first rectangle 152. The removal of the first rectangle 152 is also depicted in a fifth "slice" of the omniscient view editing timeline 104 that is a two-dimensional slice at the fifth time axis coordinate "E" 138 of the omniscient view editing timeline 104.

A sixth stage "F" of the document's editing sequence is depicted as a sixth stage two-dimensional view "F" 120 and a sixth time axis coordinate "F" 140 within the omniscient editing view 104. At this sixth stage "F," the first red rectangle 156 has been stretched vertically to create a second red rectangle 158. The omniscient view editing timeline 104 includes a sixth graphical volume 180 to depict the stretching of the first red rectangle 156 into the resized second red rectangle 158 between the fifth time axis coordinate "E" 138 and the sixth time axis coordinate "F" 140. The second red rectangle 158 is also depicted in a sixth "slice" of the omniscient view editing timeline 104 that is a two-dimensional slice at time axis coordinate "F" 140 of the omniscient view editing timeline 104.

A seventh stage "G" of the document's editing sequence is depicted as a seventh stage two-dimensional view "G" 122 and a seventh time axis coordinate "G" 142 within the omniscient editing view 104. At this seventh stage "G," second red rectangle 158 has been stretched horizontally to create a third red rectangle 160. The omniscient view editing timeline 104 includes a seventh graphical volume 182 to depict the stretching of the second red rectangle 158 into the third red rectangle 160 between the sixth time axis coordinate "F" 140 and the seventh time axis coordinate "G" 142. The third red rectangle 160 is also depicted in a seventh "slice" of the omniscient view editing timeline 104 that is a two-dimensional slice at the seventh time axis coordinate "G" 142 of the omniscient view editing timeline 104.

In addition to the above described two-dimensional document that contains graphical shapes, embodiments of the present method are able to also be used to edit two-dimensional documents that contain text or a combination of text and graphical shapes. In one such embodiment, three-dimensional structures corresponding to text fields within the two-dimensional document are able to be represented as objects such as rectangles or irregularly shaped three-dimensional objects with cross sections that roughly correspond to the outline of the text portions. The three-dimensional structures are able to have cross sections that correspond to, for example, text fields that define individual lines of text or complete paragraphs of text.

Figure 2:
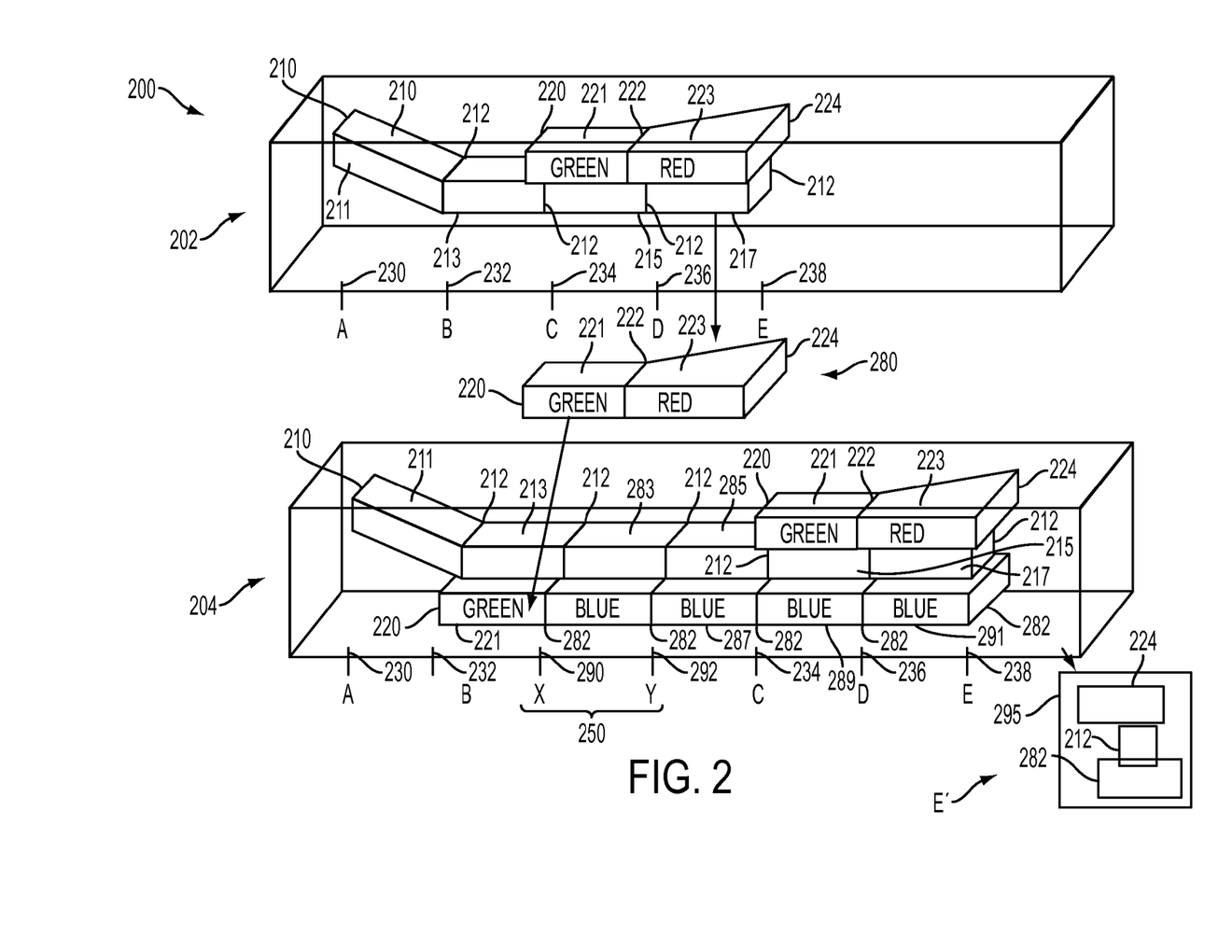
FIG. 2 is a second omniscient editing view, in accordance with one embodiment of the present method.

Reference is now made to FIG. 2, which is a second omniscient editing view 200, in accordance with one embodiment of the present method. The second omniscient editing view illustrates an ability for a user to manipulate the three-dimensional shapes that represent editing operations and the time of their occurrence.

In the example of a second omniscient editing view 200 illustrated in FIG. 2, a user selects edit shapes and is then able to insert or delete those edit shapes at various points in the three-dimensional model of the second omniscient editing view 200. By selecting groups of edit shapes and then inserting or deleting those edit shapes at selected time/location points within the three-dimensional model, the user is able to insert or remove a whole sequence of editing steps in a single action. Furthermore, an inserted sequence of steps in one embodiment of the present method results in the creation of a new "history" with individual editing steps that can then be further revised.

The second omniscient editing view shows two omniscient view editing time lines, an initial omniscient view editing timeline 202 and a subsequent omniscient view editing timeline 204. As described in further detail below, the initial omniscient view editing timeline 202 illustrates an initial sequence of editing operations used to create an initial two-dimensional graphical item. The subsequent omniscient view editing timeline 204 depicts a modified editing history based upon the initial omniscient view editing timeline 202, where the user selected shapes representing editing operations used to create the initial two-dimensional graphical item and pasted those selected shapes into a three-dimensional point in the three-dimensional representation of that editing history.

The initial omniscient editing view timeline 202 depicts an editing session similar to that described above with regards to the first omniscient editing view 100 in FIG. 1. A first rectangle 210 is created at time "A" 230. The first rectangle has been moved to a new location to create a first moved rectangle 212 at time "B" 232. This movement is depicted as a first volume 211. The initial omniscient editing view 202 depicts the continued and unmodified existence of the first moved rectangle 212 subsequent to time "B" 232 by volumes 213, 215, and 217.

At a third time "C" 234, a second green rectangle 220 is created at a different location than the first moved rectangle 213. At a fourth time "D" 236, the color of the second green rectangle 220 is changed red to form a first red rectangle 222. That first red rectangle 222 is stretched horizontally at time E 238 to form a second red rectangle 224. The existence of the second green rectangle between time "C" 234 and time "D" 286 is depicted by a first green rectangle volume 221. The modification of the first red rectangle 222 into the second red rectangle 224 is depicted by a first red volume 223. In this example, the user decides to select and copy some of the editing history depicted in the initial omniscient editing view 202. The user will then paste these selected and copied portions of the editing history into the editing history at a different two-dimensional document location and/or time, thereby created a new editing history for cut and pasted image shapes.

At a time after time "E" 238 as depicted in the initial omniscient editing view 202, the user selects a selected shape history 280, which in this example consists of the first green rectangle volume 221 and the first red volume 223. As described above, these two volumes represent the creation of the first green rectangle 220 as existed at time "C" 234, the creation of the first red rectangle 222 as existed at time "D" 236 by changing the color of the first green rectangle 220 to red, and the creation of the second red rectangle 224 as existed at time "E" 238 by stretching the first red rectangle 222. In this example, the user decides to paste a copy of the selected shape history 280 such that the first green rectangle 220 exists at time "B" 232 in the subsequent omniscient editing view 204. The first green rectangle 220 was initially created at time "C" 234 in the initial omniscient editing view 202, and the user interface of one embodiment of the present method allows a copy of that editing history to be pasted at any location within the three-dimensional model of the omniscient editing view. In this example, the selected shape history 280 is pasted at a location within the 2-dimensional document so that it begins at a time prior to the time that the original first green rectangle 220 was created. In the illustrated example, the selected shape history is inserted in so as to begin at time "B" 232.

As is shown in the subsequent omniscient editing timeline 204, insertion of the editing step sequence represented by the selected shape history 280 causes insertion of an inserted time period 250 that begins at the time point where the selected shape history 280 is inserted. The inserted time period 250 in this example is equal to the period of time over which the editing steps represented by the selected shape history were performed. In this example, the selected shape history 280 represents two time units, i.e., the time units in the interval between time "C" 234 and time "E" 238 in the initial omniscient editing timeline 202. In the subsequent omniscient editing timeline 204, an inserted time period 250 is inserted after time "B" 232 and is represented as time "X" 290 and time "Y" 292. Subsequent to the time "Y" 292, the time intervals of the initial omniscient editing view 204 resume with time "C" 234. In one embodiment, insertion of the inserted time period 250 causes the editing history of other shapes in the omniscient editing view to be simply extended through the inserted time period with corresponding volumes. In the subsequent omniscient editing timeline 204, for example, the editing history for the first moved rectangle 212 is extended by a first additional volume 283 and a second additional volume 285.

The subsequent omniscient editing view 204 depicts a modified editing history relative to the initial omniscient editing view 202, wherein the selected shape history 280 has been inserted so as to begin at time "B" 232. Further, the subsequent omniscient editing view 204 illustrates an additional history editing operation where the user modified a color change that had occurred at time "D" 236 of the original editing sequence for the selected shape history 280. In the original editing sequence for the creation of the shapes that were selected as the selected shape history 280, the color of the first green rectangle 220 was changed to red to create the first red rectangle at time "D" 236. In the pasted selected shape history 280, the color of the copied first green rectangle 220 is changed to blue at the first inserted time "X" 290 so as to create a first blue rectangle 282. The history for this pasted selected shape history 280 is propagated through the rest of the subsequent omniscient editing view 204 by corresponding volumes, such as volumes 287, 289, and 291. The resulting image 295 at time "E" 238 after insertion of the selected shape history 280 as modified by subsequent editing of its history at time "X" 290 is shown to include the second red rectangle 224 and the first moved rectangle 212 as were present in the initial omniscient editing view 202. In addition to those shapes, a first blue rectangle 282, which corresponds to the pasted selected shape history 280 as modified by subsequent editing of its history at time "X" 290, to change its color to blue.

The above described three-dimensional representation of editing history provides a visualization of all of the previously performed editing steps that created the current two-dimensional document. This three-dimensional representation is able to be used to locate steps within the editing history of the two-dimensional document that the user desires to change. The following figures illustrate one example of user interface utilities to support changing prior editing commands. The following figures describe providing a two-dimensional view at a particular chosen time slice within the three-dimensional representation. The user is then able to apply two-dimension object manipulation methods in order to insert new editing steps into the editing history depicted by the three-dimensional representation.

Figure 3:
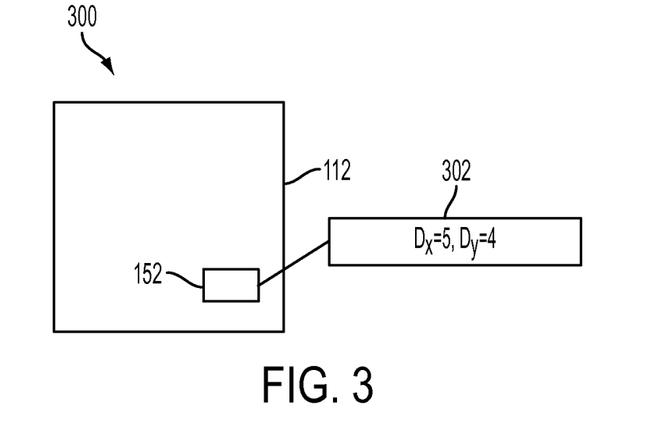
FIG. 3 is a time slice editing user interface used to edit a two-dimensional view as depicted in FIG. 1, in accordance with one embodiment of the present method.

Reference is now made to FIG. 3, which is a time slice editing user interface 300 used to edit a two-dimensional view as depicted in FIG. 1, in accordance with one embodiment of the present method. The time slice user interface 300 depicts a user interface that is presented to a user to facilitate editing of a two-dimensional view corresponding to a time slice through an omniscient editing view. The illustrated time slice user interface 300 depicts a user interface presented to a user working with the first omniscient editing view 100 described as an example in FIG. 1, discussed above. The illustrated time slice user interface 300 depicts a presentation of the second two-dimensional view "B" 112 as depicted in the first omniscient editing view 100. As described above with regards to FIG. 1, the second two-dimensional view "B" 112 includes the moved first green rectangle 152. In order to provide a user with means of adjusting the parameters of the shapes contained in that two-dimensional view, a user interface box 302 is provided to display to the user the current parameters of a shape and allow the user to enter new values for those parameters. In the illustrated example, a two-dimensional size of the moved first green rectangle 152 is displayed and a user interface box 302 is also presented in the user interface. The user interface box describes the two-dimensional size of the moved first green rectangle 152 as Dx=5 and Dy=4, which corresponds to horizontal size and the vertical size, respectively, of that object. In one embodiment, a user is able to drag one side of the shape, e.g., the moved first green rectangle 152, as it is displayed on the screen and the size of that object displayed in the user interface box 302 is changed to reflect that movement. Alternatively, one embodiment of the present invention allows the user to simply place a cursor into the user interface box 302, or to select text in the user interface box 302, and type in new sizes for each dimension of the shape being edited.

Figure 4:
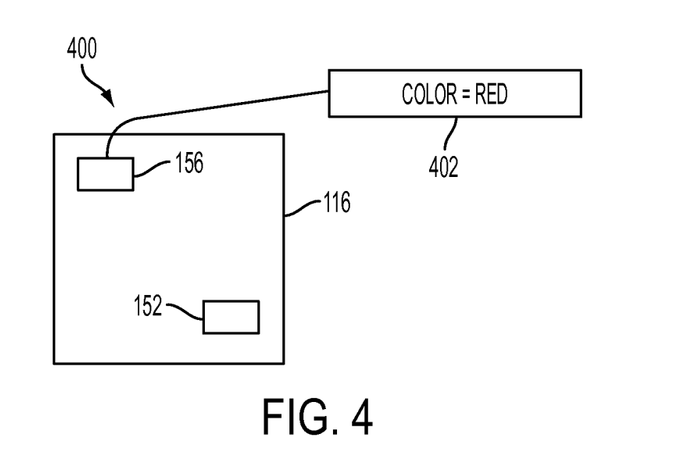
FIG. 4 is a second time slice editing user interface used to edit a second two-dimensional view as depicted in FIG. 1, in accordance with one embodiment of the present method.

Reference is now made to FIG. 4, which is a second time slice editing user interface 400 used to edit a second two-dimensional view as depicted in FIG. 1, in accordance with one embodiment of the present method. The second time slice user interface 400 depicts a user interface similar to that presented above for the time slice user interface 300 depicted in FIG. 3. The illustrated time slice user interface 300 depicts a presentation of the fourth two-dimensional view "D" 116 as depicted in the first omniscient editing view 100. As described above with regards to FIG. 1, the fourth two-dimensional view "D" 116 includes the moved first green rectangle 152 and the first red rectangle 156. A second user interface box 402 is shown that indicates the current color of the first red rectangle 156, which is red. In one embodiment, a user is able to place a cursor into the second user interface box 402, or to select text in the user interface box 402, and type in a new color for the shape being edited.

Figure 5:
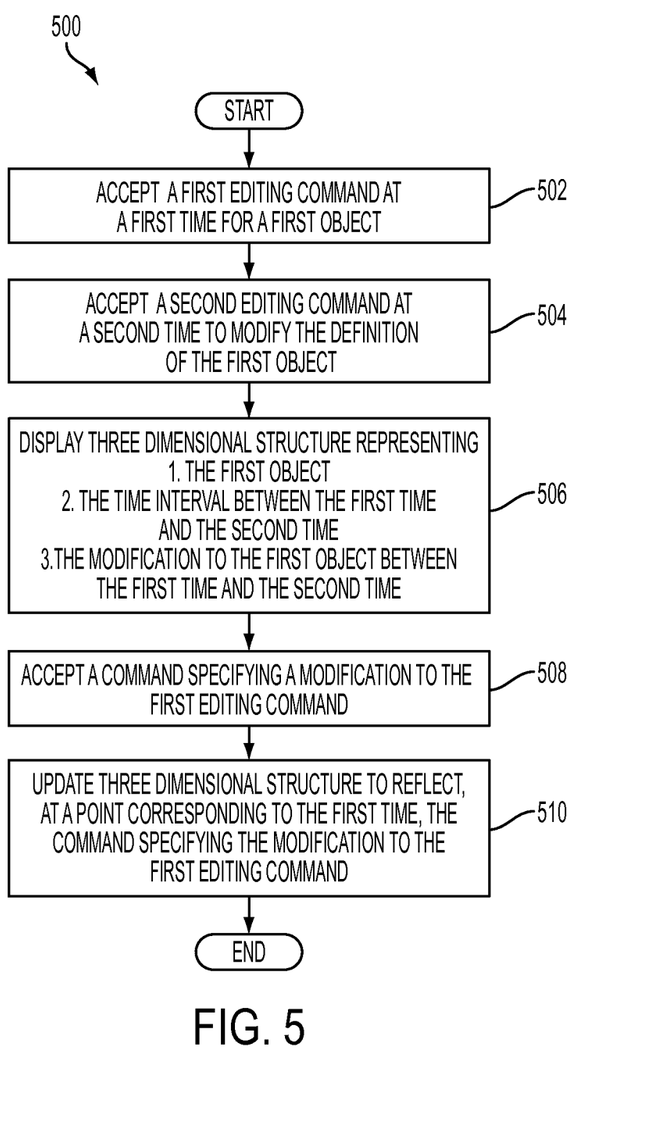
FIG. 5 is a document editing processing flow according to one embodiment of the present method.

Reference is now made to FIG. 5, which is a document editing processing flow 500 according to one embodiment of the present method. The document editing processing flow 500 begins by accepting, at 502, a first editing command at a first time for a first two-dimensional object within a two-dimensional document. Example editing commands include, for example, commands to create, resize, change a color associated with, delete, or move the object. The first two-dimensional object of one embodiment has two dimensions, for example, a height and a width.

The document editing processing flow 500 proceeds by accepting, at 502, a second editing command at a second time to modify the definition of the first two-dimensional object within the two-dimensional document. Commands to modify the definition of a two-dimensional object within the two-dimensional document includes, for example, commands to resize, change a color associated with, delete, or move the object.

The document editing processing flow 500 proceeds by displaying, at 506, a three-dimensional structure representing 1) the first object; 2) the time interval between the first and second time; and 3) the modification to the object between the first time and the second time. An example of the displayed three-dimensional structure includes, for example, the first graphical volume 170 that depicts 1) the first green rectangle 150 as a first object; 2) the editing command to move the first green rectangle 150 between the first time axis coordinate "A" 130 to the moved first green rectangle 152 at the second time axis coordinate "B" 132; and 3) the moved first green rectangle 152 as the modification of the object.

The document editing processing flow 500 proceeds by accepting, at 508, a third editing command specifying a modification to the first editing command. The third editing command is similar to the second editing command described above. An example of a sequence of the first editing command, the second editing command, and the third editing command is a command to create a green rectangle at the first time, followed by a command to move the green rectangle at the second time, followed by a command to change the color of the green rectangle created at the first time to change the editing history to reflect that the color green rectangle is changed to blue at the first time.

The document editing processing flow 500 then proceeds by updating, at 510, the three-dimensional structure to reflect, at a point corresponding to the first time, the third command specifying a modification to the first command. In the above described example, the three-dimensional structure depicting the first editing command is changed to indicate that the color of the created rectangle at the first time is blue instead of its original green. The processing then ends.

Figure 6:
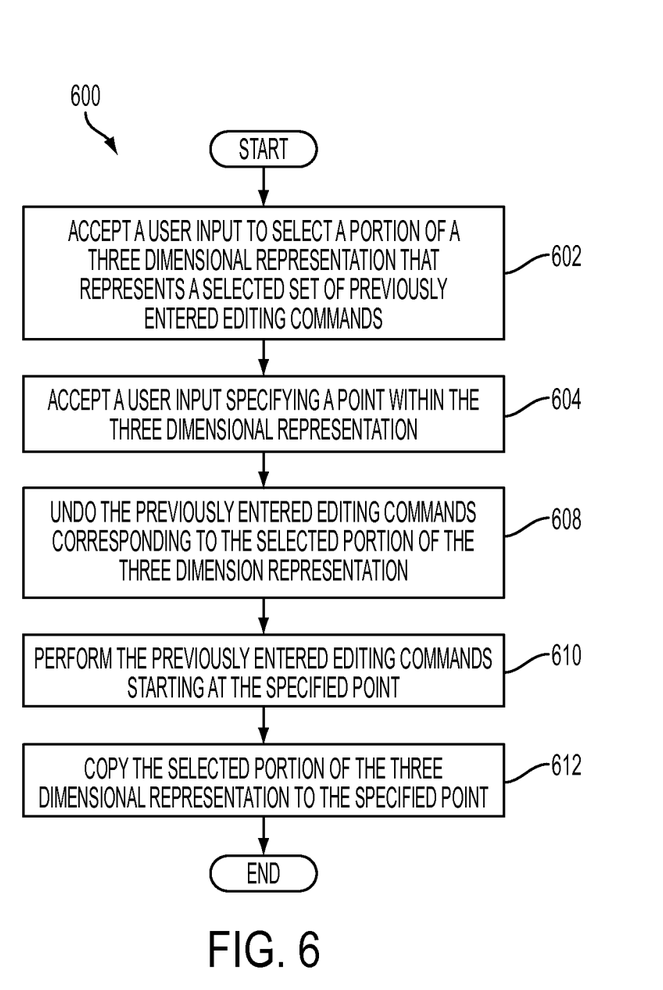
FIG. 6 is an editing sequence copy and paste processing flow according to one embodiment of the present method.

Reference is now made to FIG. 6, which is an editing sequence copy and paste processing flow 600 according to one embodiment of the present method. The editing sequence copy and paste processing flow 600 of one embodiment is performed after, for example, the processing flow described above with reference to FIG. 5.

The editing sequence copy and paste processing flow 600 begins by accepting, at 602, user input to select a portion of a three-dimensional structure that corresponds to a selected set of previously entered editing commands that define or modify two-dimensional shapes within a two-dimensional document. An example of such a selection is a user's selecting the selected shape history 280 described above with reference to FIG. 2, and which in that example consisted of the first green rectangle volume 221 and the first red volume 223. As described above with reference to FIG. 2, these two volumes represent the creation of the first green rectangle 220 as existed at time "C" 234, the creation of the first red rectangle 222 as existed at time "D" 236 by changing the color of the first green rectangle 220 to red, and the creation of the second red rectangle 224 as existed at time "E" 238 by stretching the first red rectangle 222.

The editing sequence copy and paste processing flow 600 proceeds by accepting, at 604, a user input specifying a three-dimensional point within the three-dimensional representation. In one embodiment, a user is able to select a desired point in time along the time axis of the three-dimensional representation and be presented with a two-dimensional representation of the document being edited as it exited at the selected time. The user is then able to select a point in the two-dimensional document as it existed at the selected time in history at which the beginning of the selected shape history is to be inserted.

The editing sequence copy and paste processing flow 600 continues by undoing, at 608, the previously entered editing commands corresponding to the selected portion of the three-dimensional structure. Although not depicted in the second omniscient editing view 200 discussed above with reference to FIG. 2, an example of this step to the presently described example would is performing an undoing of the commands represented by the selected shape history 280. In particular, in this example, this step causes the editing commands of creating the first green rectangle 220, changing its color to red to create the first red rectangle 222, and stretching the first red rectangle 222 to create the second red rectangle 224 are undone in the editing history to essentially remove the selected shape history 208 from the editing history.

The editing sequence copy and paste processing flow 600 continues by performing, at 610, the previously entered editing commands corresponding to the selected portion of the three-dimensional structure, but with those editing command starting at the above selected point instead of the starting point for the previously performed editing commands.

The editing sequence copy and paste processing flow 600 continues by copying, at 612, the selected portion of the three-dimensional structure to the above selected point. In the example of FIG. 2, discussed above, this corresponds to drawing the selected shape history 280 at the selected location starting at time "B" 232. The processing then ends.

Figure 7:
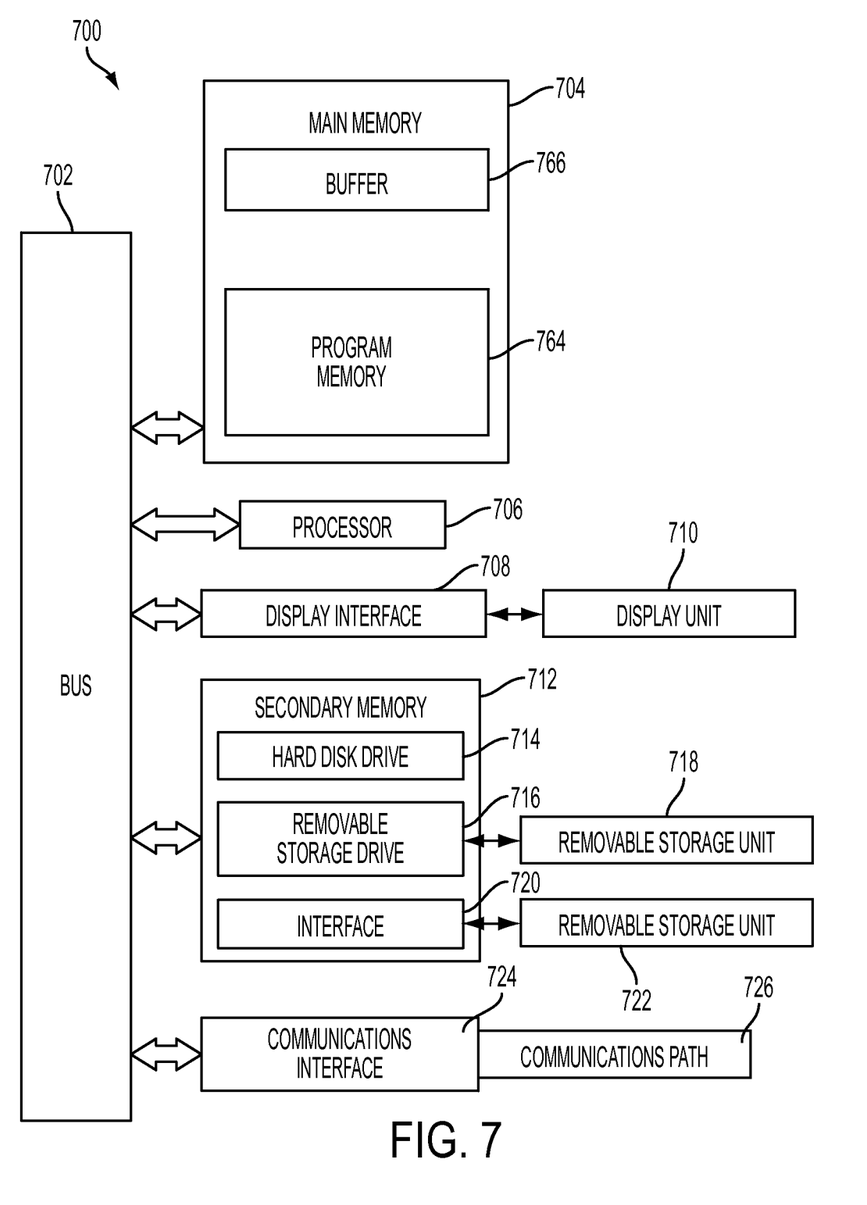
FIG. 7 is a block diagram of a computer system useful for implementing one embodiment of the method illustrated in the flow diagram of FIGS. 5 and 6.

Reference is now made to FIG. 7 which illustrates a block diagram of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the embodiments described herein with respect to FIGS. 1-4 and the flow diagrams of FIGS. 5 and 6.

Special purpose computer system 700 includes processor 706 for executing machine executable program instructions for carrying out all or some of the present method. The processor is in communication with bus 702. The system includes main memory 704 for storing machine readable instructions. Main memory may comprise random access memory (RAM) to support reprogramming and flexible data storage. Buffer 766 stores data addressable by the processor. Program memory 764 stores machine readable instructions for performing the present method. A display interface 708 forwards data from bus 702 to display 710. Secondary memory 712 includes a hard disk 714 and storage device 716 capable of reading/writing to removable storage unit 718, such as a floppy disk, magnetic tape, optical disk, etc. Secondary memory 712 may further include other mechanisms for allowing programs and/or machine executable instructions to be loaded onto the processor. Such mechanisms may include, for example, a storage unit 722 adapted to exchange data through interface 720 which enables the transfer of software and data. The system includes a communications interface 724 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 726 which carries such signals and may be implemented using wire, cable, fiber optic, phone line, cellular link, RF, memory, or other means known in the arts.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that the flow diagrams presented herein are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on a storage device that is readable by a compatible machine architecture, xerographic system, color management or other image processing system, any of which are capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for presenting a time sequence of editing steps in a two-dimensional document, the method comprising:

accepting, at a first time on an electronic document editing device, a first editing command for a first two-dimensional object within a two-dimensional electronic document, the two-dimensional electronic document defining objects with a first dimension and a second dimension;

accepting, at the electronic document editing device at a second time subsequent to the first time, a second editing command specifying a modification to a definition of the first two-dimensional object within at least one of the first dimension and the second dimension; and displaying, on a display device, a representation of a three-dimensional structure corresponding to the first two-dimensional object, the three-dimensional structure depicting at least one of the first dimension and the second dimension and representing time as a third dimension that is orthogonal to the first dimension and the second dimension, the three-dimensional structure representing a time interval between the first time and the second time as structural elements extending along the third dimension, the three-dimensional structure extending along the third dimension from a first time point corresponding to the first time to a second time point corresponding to the second time, the three-dimensional structure having components at the first time point in the first dimension and the second dimension that represent a view of the first two-dimensional object, the three-dimensional structure having components at the second time point in the first dimension and the second dimension that represent a view of the second two-dimensional object, the structural elements extending along the third dimension from the view of the first two-dimensional object to the view of the second two-dimensional object, the structural elements representing the modification to the definition of the first two-dimensional object as specified by the second editing command, the structural elements extending along the third dimension with first dimension components and second dimension components corresponding to the first editing command, and three-dimensional structure representing a time interval subsequent to the second time as a subsequent three-dimensional object representing the first two-dimensional object as modified by the second editing command, the subsequent three-dimensional object having subsequent first dimension components and subsequent second dimension components corresponding to the second editing command and extended along the third dimension, accepting, at a third time that is subsequent to the second time, a command specifying a modification to the first editing command; and updating, in response to accepting the command specifying the modification to the first editing command, the three-dimensional structure to reflect, at a point corresponding to the first time within the three-dimensional structure, the modification of the first editing command, the updating further modifying the three dimensional structure along the third dimension to reflect the modification of the first editing command.

2. The method of claim 1, further comprising:
accepting, at a third time that is subsequent to the second time, an input to undo the first editing command;
undoing, in response to accepting the input to undo the first editing command, the first editing command, the undoing operating to return the first two-dimensional object to its condition prior to the execution of the first editing command;
modifying, in response to accepting the input to undo the first editing command, the structural elements of the three-dimensional structure to remove effects of the first editing command between the first time point and the second time point; and
modifying the subsequent three-dimensional object to remove effects of the first editing command.

3. The method of claim 1, the first two-dimensional object comprising a representation of a text field within the two-dimensional electronic document.

4. The method of claim 1, further comprising:
accepting a first user input, the first user input selecting, based upon a specification of points indicated by the first user input in the representation of the three-dimensional structure, a user selected three-dimensional structure corresponding to a sequence of editing commands between a third time point corresponding to a third time and a fourth time point corresponding to a fourth time, the user selected three-dimensional structure having shapes defined in the first dimension and the second dimension according to the sequence of editing commands occurring between the third time and the fourth time;
accepting a second user input specifying a three-dimensional point represented within the display device corresponding to a user specified position at the first dimension and the second dimension within the two-dimensional electronic document, the user specified three-dimensional point further specifying a user specified time point relative to the representation of the three-dimensional structure; and adding, in response to accepting the first user input and the second user input, an additional three-dimensional structure beginning at the user specified time point and extending along the third dimension, the additional three-dimensional structure comprising structural elements representing the sequence of editing commands represented by the user selected three-dimensional structure that occurred between the third time and the fourth time, the adding causing the sequence of editing commands occurring between the third time and the fourth time as represented by the user selected three-dimensional structure to also be displayed on the display device and inserting into the two dimensional document at least one two-dimensional object corresponding to the additional three dimensional structure.

5. The method of claim 4, further comprising:
accepting, subsequent to accepting the first user input and the second user input, a third user input specifying undoing editing commands reflected by the user selected three-dimensional structure;
undoing, in response to accepting the third user input, the sequence of editing commands occurring between the third time and the fourth time that are represented by the user selected three-dimensional structure; and
removing, in response to accepting the third user input, the user selected three-dimensional structure from the representation of the three-dimensional structure.

6. The method of claim 1, further comprising:
accepting, at the electronic document editing device at a third time subsequent to the first time, a third editing command for a second two-dimensional object within the two-dimensional electronic document; and
displaying, on the display device, a representation of an additional three-dimensional structure corresponding to the second two-dimensional object along with the three-dimensional representation of the first two-dimensional object, the additional three-dimensional structure extending along the third dimension from a third time point corresponding to the third time,
the additional three-dimensional structure depicting at least one of the first dimension and the second dimension and representing time as a third dimension illustrated as being orthogonal to the first dimension and the second dimension,
the additional three-dimensional structure representing first dimension components and second dimension components corresponding to the third editing command at the third time point and extending from the third time point.

7. The method of claim 6, the first two-dimensional object and the second two-dimensional object comprising at least one graphical shape.

8. The method of claim 1, further comprising:
accepting, at a fourth time that is subsequent to the second time and prior to the third time, a user selection input based upon a specification of a point on the representation of three-dimensional structure; and
displaying, in response to accepting the selection input, a user interface input object configured to accept the command specifying a modification to the first editing command, and
the accepting the command specifying a modification being performed through the user interface input object.

9. A system for resizing a digitally represented color image, the system comprising:
a memory;
a storage medium for storing data; and a processor in communication with the storage medium and the memory, the processor executing machine readable instructions for performing the method of:

accepting, at a first time on an electronic document editing device, a first editing command for a first two-dimensional object within a two-dimensional electronic document, the two-dimensional electronic document defining objects with a first dimension and a second dimension;

accepting, at the electronic document editing device at a second time subsequent to the first time, a second editing command specifying a modification to a definition of the first two-dimensional object within at least one of the first dimension and the second dimension; and displaying, on a display device, a representation of a three-dimensional structure corresponding to the first two-dimensional object, the three-dimensional structure depicting at least one of the first dimension and the second dimension and representing time as a third dimension that is orthogonal to the first dimension and the second dimension, the three-dimensional structure representing a time interval between the first time and the second time as structural elements extending along the third dimension, the three-dimensional structure extending along the third dimension from a first time point corresponding to the first time to a second time point corresponding to the second time, the three-dimensional structure having components at the first time point in the first dimension and the second dimension that represent a view of the first two-dimensional object, the three-dimensional structure having components at the second time point in the first dimension and the second dimension that represent a view of the second two-dimensional object, the structural elements extending along the third dimension from the view of the first two-dimensional object to the view of the second two-dimensional object, the structural elements representing the modification to the definition of the first two-dimensional object as specified by the second editing command, the structural elements extending along the third dimension with first dimension components and second dimension components corresponding to the first editing command, and three-dimensional structure representing a time interval subsequent to the second time as a subsequent three-dimensional object representing of the first two-dimensional object as modified by the second editing command, the subsequent three-dimensional object having subsequent first dimension components and subsequent second dimension components corresponding to the second editing command and extended along the third dimension, accepting, at a third time that is subsequent to the second time, a command specifying a modification to the first editing command; and updating, in response to accepting the command specifying the modification to the first editing command, the three-dimensional structure to reflect, at a point corresponding to the first time within the three-dimensional structure, the modification of the first editing command, the updating further modifying the three dimensional structure along the third dimension to reflect the modification of the first editing command.

10. The system of claim 9, the method further comprising:
accepting, at a third time that is subsequent to the second time, an input to undo the first editing command;
undoing, in response to accepting the input to undo the first editing command, the first editing command, the undoing operating to return the first two-dimensional object to its condition prior to the execution of the first editing command;
modifying, in response to accepting the input to undo the first editing command, the structural elements of the three-dimensional structure to remove effects of the first editing command between the first time point and the second time point; and
modifying the subsequent three-dimensional object to remove effects of the first editing command.

11. The system of claim 9, the first two-dimensional object comprising a representation of a text field within the two-dimensional electronic document.

12. The system of claim 9, the method further comprising:
accepting a first user input, the first user input selecting, based upon a specification of points indicated by the first user input in the representation of the three-dimensional structure, a user selected three-dimensional structure corresponding to a sequence of editing commands between a third time point corresponding to a third time and a fourth time point corresponding to a fourth time, the user selected three-dimensional structure having shapes defined in the first dimension and the second dimension according to the sequence of editing commands occurring between the third time and the fourth time;
accepting a second user input specifying a three-dimensional point represented within the display device corresponding to a user specified position at the first dimension and the second dimension within the two-dimensional electronic document, the user specified three-dimensional point further specifying a user specified time point relative to the representation of the three-dimensional structure; and
adding, in response to accepting the first user input and the second user input, an additional three-dimensional structure beginning at the user specified time point and extending along the third dimension, the additional three-dimensional structure comprising structural elements representing the sequence of editing commands represented by the user selected three-dimensional structure that occurred between the third time and the fourth time, the adding causing the sequence of editing commands occurring between the third time and the fourth time as represented by the user selected three-dimensional structure to also be displayed on the display device and
inserting into the two dimensional document at least one two-dimensional object corresponding to the additional three dimensional structure.

13. The system of claim 9, the method further comprising:
accepting, at the electronic document editing device at a third time subsequent to the first time, a third editing command for a second two-dimensional object within the two-dimensional electronic document; and
displaying, on the display device, a representation of an additional three-dimensional structure corresponding to the second two-dimensional object along with the three-dimensional representation of the first two-dimensional object, the additional three-dimensional structure extending along the third dimension from a third time point corresponding to the third time, the additional three-dimensional structure depicting at least one of the first dimension and the second dimension and representing time as a third dimension illustrated as being orthogonal to the first dimension and the second dimension, the additional three-dimensional structure representing first dimension components and second dimension components corresponding to the third editing command at the third time point and extending from the third time point.

14. The system of claim 13, the first two-dimensional object and the second two-dimensional object comprising at least one graphical shape.

15. The system of claim 9, the method further comprising:

accepting, at a fourth time that is subsequent to the second time and prior to the third time, a user selection input based upon a specification of a point on the representation of three-dimensional structure; and displaying, in response to accepting the selection input, a user interface input object configured to accept the command specifying a modification to the first editing command, and the accepting the command specifying a modification being performed through the user interface input object.

16. A method for presenting a time sequence of editing steps in a two-dimensional document, the method comprising:

accepting, at a first time on an electronic document editing device, a first editing command for a first two-dimensional object within a two-dimensional electronic document, the two-dimensional electronic document defining objects with a first dimension and a second dimension;

accepting, at the electronic document editing device at a second time subsequent to the first time, a second editing command specifying a modification to a definition of the first two-dimensional object within at least one of the first dimension and the second dimension; and displaying, on a display device, a representation of a three-dimensional structure corresponding to the first two-dimensional object, the three-dimensional structure depicting at least one of the first dimension and the second dimension and representing time as a third dimension that is orthogonal to the first dimension and the second dimension, the three-dimensional structure representing a time interval between the first time and the second time as structural elements extending along the third dimension, the three-dimensional structure extending along the third dimension from a first time point corresponding to the first time to a second time point corresponding to the second time, the three-dimensional structure having components at the first time point in the first dimension and the second dimension that represent a view of the first two-dimensional object, the three-dimensional structure having components at the second time point in the first dimension and the second dimension that represent a view of the second two-dimensional object, the structural elements extending along the third dimension from the view of the first two-dimensional object to the view of the second two-dimensional object, the structural elements representing the modification to the definition of the first two-dimensional object as specified by the second editing command, the structural elements extending along the third dimension with first dimension components and second dimension components corresponding to the first editing command, and three-dimensional structure representing a time interval subsequent to the second time as a subsequent three-dimensional object representing the first two-dimensional object as modified by the second editing command, the subsequent three-dimensional object having subsequent first dimension components and subsequent second dimension components corresponding to the second editing command and extended along the third dimension;

accepting, at the electronic document editing device at a third time subsequent to the first time, a third editing command for a second two-dimensional object within the two-dimensional electronic document; and displaying, on the display device, a representation of an additional three-dimensional structure corresponding to the second two-dimensional object along with the three-dimensional representation of the first two-dimensional object, the additional three-dimensional structure extending along the third dimension from a third time point corresponding to the third time, the additional three-dimensional structure depicting at least one of the first dimension and the second dimension and representing time as a third dimension illustrated as being orthogonal to the first dimension and the second dimension, the additional three-dimensional structure representing first dimension components and second dimension components corresponding to the third editing command at the third time point and extending from the third time point, accepting a first user input, the first user input selecting, based upon a specification of points indicated by the first user input in the representation of the three-dimensional structure, a user selected three-dimensional structure corresponding to a sequence of editing commands between a third time point corresponding to a third time and a fourth time point corresponding to a fourth time, the user selected three-dimensional structure having shapes defined in the first dimension and the second dimension according to the sequence of editing commands occurring between the third time and the fourth time;

accepting a second user input specifying a three-dimensional point represented within the display device corresponding to a user specified position at the first dimension and the second dimension within the two-dimensional electronic document, the user specified three-dimensional point further specifying a user specified time point relative to the representation of the three-dimensional structure; and adding, in response to accepting the first user input and the second user input, an additional three-dimensional structure beginning at the user specified time point and extending along the third dimension, the additional three-dimensional structure comprising structural elements representing the sequence of editing commands represented by the user selected three-dimensional structure that occurred between the third time and the fourth time, the adding causing the sequence of editing commands occurring between the third time and the fourth time as represented by the user selected three-dimensional structure to also be displayed on the display device and inserting into the two dimensional document at least one two-dimensional object corresponding to the additional three dimensional structure.

17. The method of claim 16, further comprising:

accepting, subsequent to accepting the first user input and the second user input, a third user input specifying undoing editing commands reflected by the user selected three-dimensional structure;

undoing, in response to accepting the third user input, the sequence of editing commands occurring between the third time and the fourth time that are represented by the user selected three-dimensional structure; and removing, in response to accepting the third user input, the user selected three-dimensional structure from the representation of the three-dimensional structure.

18. The method of claim 16, the first two-dimensional object comprising a representation of a text field within the two-dimensional electronic document.

\* \* \* \* \*